United States Patent [19]

Tischer

[11] Patent Number: 5,072,802
[45] Date of Patent: Dec. 17, 1991

[54] CONTROL MECHANISM FOR TWO HYDRAULIC ADJUSTMENT DEVICES SUPPLIED VIA ONE, EACH, CURRENT BRANCH BY A HIGH-PRESSURE PUMP

[75] Inventor: Werner Tischer, Heubach-Lautern, Fed. Rep. of Germany

[73] Assignee: Zahnradfabrik Friedrichshafen, AG, Friedrichshafen, Fed. Rep. of Germany

[21] Appl. No.: 469,576

[22] PCT Filed: Nov. 24, 1988

[86] PCT No.: PCT/EP88/01064
§ 371 Date: Apr. 18, 1990
§ 102(e) Date: Apr. 18, 1990

[87] PCT Pub. No.: WO89/05256
PCT Pub. Date: Jun. 15, 1989

[30] Foreign Application Priority Data

Dec. 1, 1987 [DE] Fed. Rep. of Germany ....... 3740661

[51] Int. Cl.⁵ .............................................. B62D 5/06
[52] U.S. Cl. ..................................... 180/132; 60/384; 60/422; 60/450; 91/516; 91/518
[58] Field of Search ................. 60/384, 387, 421, 422, 60/426, 450; 91/516, 518; 180/132, 141

[56] References Cited

U.S. PATENT DOCUMENTS

| | | | |
|---|---|---|---|
| 4,043,419 | 8/1977 | Larson et al. | 60/384 X |
| 4,470,260 | 9/1984 | Miller et al. | 60/422 |
| 4,664,210 | 5/1987 | Yamaoka et al. | 180/141 X |
| 4,665,195 | 5/1987 | Rau et al. | 60/384 |

*Primary Examiner*—Charles A. Marmor
*Assistant Examiner*—Alan M. Kagen
*Attorney, Agent, or Firm*—Albert M. Zalkind

[57] ABSTRACT

A control mechanism for two consumers includes a flow divider valve (3) which is connected to a pump 2. From flow divider valve (3) springs a flow line (12) for the working flow (A) of a first adjustment device (10) such as a steering motor. Another flow line (13) of the flow divider valve (3) leads via an activation valve (14) to a second adjustment device (15). A pilot flow line (4) connected with the flow divider valve (3) via a measurement diaphragm (3A), is connected with a pilot valve (5). Pilot valve (5) can choke or entirely block the connection from the pilot flow line (4) to a nonreturn line (11) for the purpose of setting a pressure in flow line (12). For purposes of activation, pilot valve (5) is coupled with a steering valve (6) that controls flow line (12) so that both valves can be deflected together during one steering movement. A hydraulic steering unit is provided as the steering mechanism and it includes a rod-set connection from a manual steering wheel to the vehicle wheels.

3 Claims, 2 Drawing Sheets

CONTROL MECHANISM FOR TWO HYDRAULIC ADJUSTMENT DEVICES SUPPLIED VIA ONE, EACH, CURRENT BRANCH BY A HIGH-PRESSURE PUMP

This invention relates to a control mechanism for two hydraulic adjustment devices supplied by a high-pressure pump via separate flow lines.

BRIEF DESCRIPTION OF THE PRIOR ART

Such control mechanisms are already known from German published patent application No. 35 40 236 and German published patent application No. 36 03 988. Here, a flow divider valve subdivides the oil flow, generated by a high-pressure pump, into two flow branches. One branch conducts a working flow via a steering valve to a first adjustment device such as a steering motor, and the other branch supplies a second adjustment device such as a hydraulic lifting unit with a residual flow. The flow divider valve is constructed so that it will supply oil pressure as needed to the steering function which is decisive as regards driving safety.

A measurement diaphragm is located behind a control edge of the flow divider valve for the working flow of the steering function. A small pilot flow constantly flows via this measurement diaphragm to the steering valve in its neutral position. This pilot flow serves for the initial regulation of a pressure in the steering motor and for tempering the steering valve, regardless of the load on the steering motor. This latter measure prevents a situation where the steering valve might get stuck due to heat expansion.

In the aforementioned German application No. 35 40 236, a constant pump is used for the purpose of supplying the control mechanism, and this pump always provides maximum pressure and maximum quantity. In the second German application No. 36 03 988, on the other hand, there is an adjustable pump which varies according to the requirements of the particular highest pressure in the first or second adjustment device. In this case, two control lines are needed which scan the particular working pressure of both adjustment devices and which guide it to the lifting element of the adjustment pump. The coordination of the known control mechanism is accomplished, as regards the combination here, with hydrostatic steering gears.

Such steering gears do not have any fixed rod connections to the drive wheels of the vehicle. By way of a steering valve, there is provided a metering pump which can be activated by a manual steering wheel and which feeds the working flow, depending on the direction of rotation, via high-pressure lines to one or the other pressure chamber of the steering motor. A vehicle equipped with this kind of steering valve, for example, can be used at construction sites and in agriculture. The maximum speed is restricted to 50 km/hr by law for safety reasons.

SUMMARY OF THE INVENTION

It is an object of the invention to provide a hydraulic auxiliary power steering assembly instead of a hydrostatic steering assembly in the control mechanism. According to the invention, the first adjustment mechanism includes a hydraulic steering valve with a mechanical connection between the manual steering wheel and the steered wheels of the vehicle. The steering valve for controlling the working piston is coupled with a pilot valve that is connected in a pilot flow line so that the steering and pilot valves can be adjusted together as the manual steering wheel is turned. In the neutral position, the pilot valve allows the oil to flow off into the tank. As soon as the operator initiates a movement of the manual steering wheel, the steering valve is shifted so that a working flow line is connected with a pressure side of the steering motor. Simultaneously, the pilot valve regulates a pressure—via the flow divider valve—in this working flow line. By using a pilot valve coupled with the steering valve, it is also possible to regulate an auxiliary power steering assembly (i.e. a rod set connection to the wheels) via a pilot flow. A vehicle with this kind of design of its hydraulic control mechanism is also licensed for speeds above 50 km/hr for fast-moving vehicles.

The control mechanism can be operated advantageously with a constant pump or a variable pump. When one uses a variable pump, there are provided only two additional control lines with nonreturn valves which detect the buildup of the working pressure in both adjustment devices and which conduct the pressure to the lifting element of the adjusting pump. In this way, one can make sure that the adjusting pump will supply only the momentarily required delivery quantity in order to save energy.

BRIEF DESCRIPTION OF THE FIGURES

Other objects and advantages of the invention will become apparent from a study of the following specification when viewed in the light of the accompanying drawings, in which.

DETAILED DESCRIPTION

Figure 1:
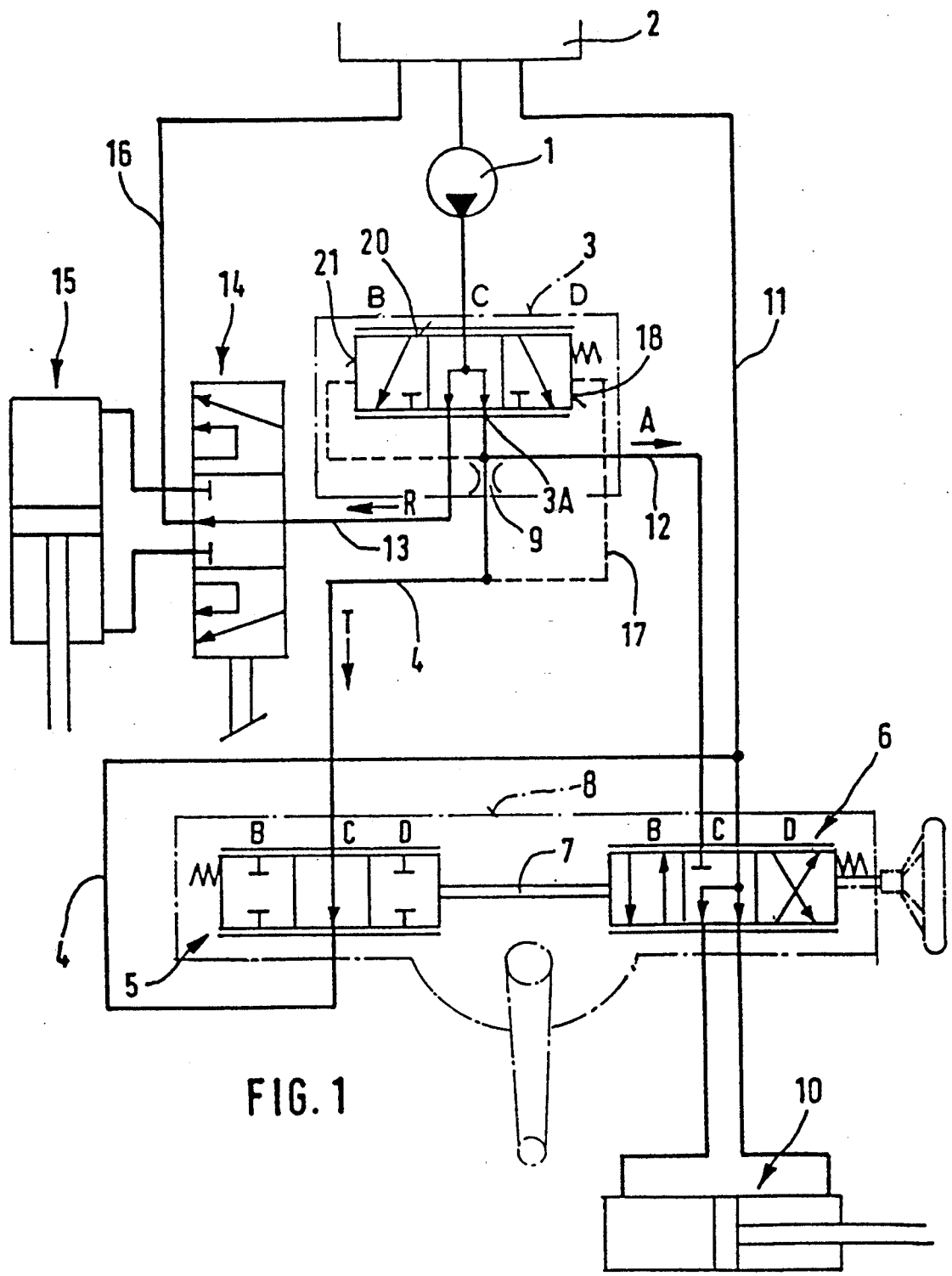
FIG. 1 is a circuit diagram of the preferred embodiment of the control mechanism supplied by a constant pump with an auxiliary power steering unit as the first adjusting device and a hydraulic working unit as the second adjustment device with control valves illustrated in the neutral position.

In the control mechanism according to FIG. 1, a constant pump 1 draws an oil flow from a tank 2. A drive mechanism drives pump 1 which supplies a certain specific oil pressure. Connected to pump 1 is a flow divider valve 3 with positions B, C, D. By positions B and D are meant extreme positions. From the middle position C, any desired intermediate position in both directions can be reached depending on the pressure conditions. The flow divider valve 3 has the task of restricting oil flow of pump 1 to a small component T in a pilot flow line 4. For this purpose, a measurement diaphragm 9 is used which, in the direction of flow, is located behind a control edge 3A. According to the invention, the pilot flow line 4 leads to a pilot valve 5 with positions B, C, and D.

Pilot valve 5 is coupled with a steering valve 6 by means of a connecting member 7 so that these two valves 5 and 6 can always be operated simultaneously in the same direction. Steering valve 6 likewise has positions B, C, and D and serves for selecting a first adjustment device 10. Adjustment device 10 can be built upon the steering axle, as a separate steering motor, outside a steering housing 8. It is also possible to arrange the adjustment device 10 inside the steering housing 8. In the latter case, a threaded spindle positioned in ball bearings engages a piston. The piston has toothing which engages a steering segment connected with a steering arm lever. The structure of such a ball-nut hydraulic steering unit which is also called "block steering gear," can be seen, for example, in German patent 29 13 484.

In the neutral position C as illustrated, pilot valve 5 connects pilot flow line 4 with a nonreturn line 11 that is connected to the tank 2. Steering valve 6, which is likewise in position C, establishes a connection from the nonreturn line 11 to the two pressure chambers of the first adjustment device 10. Steering valve 6 blocks a flow line 12, which starts from the flow divider valve 3, for the working flow A of the first adjustment device 10. Another flow line 13 for a residual flow 6 leads to an activation valve 14 which controls a second adjustment device 15 of a hydraulic lifting unit. Activation valve 14 is also in the neutral position in which it connects the flow line 13 to a nonreturn line 16.

If the driver turns the manual steering wheel in such a manner that steering valve 6 and pilot valve 5 are shifted into their position B, then steering valve 6 gradually establishes a connection from flow line 12 to the left pressure side of the first adjustment device 10. The right pressure side maintains connection with the nonreturn line 11 or the tank 2. Because the pilot valve 5 simultaneously increasingly forcefully chokes the flow-off of the oil via the pilot flow line 4 to the tank 2, the valve regulates in the flow line 12 a pressure which is in a position to shift the working piston of the first adjustment device 10 to the right. Depending on the amount of the pressure demanded in the first adjustment device 10—a pressure that is adjusted as a function of the manual force or of the degree of shift of valves 5 and 6—a corresponding pressure is also provided in the pilot flow line 4. This pressure is transmitted via a control line 17 to a biassed end 18 of the flow divider valve 3 so that the valve will release a correspondingly larger control cross-section from pump 1 to flow line 12. The control cross-section is made larger as the result of a shift of a valve piston 20 of the flow divider valve 3 against the pressure force of the working pressure of the working pressure A on the left surface 21 of the valve piston 20.

If, during a steering movement, the driver simultaneously adjusts the activation valve 14 of the second adjustment device, then this adjustment device, by way of a residual flow R, at most will be getting only as much oil pressure as would correspond to the maximum delivery of pump 1, minus the momentary working flow A and the flow component T. The second adjustment device 15 must get along with this residual flow R because flow divider valve 3 always supplies the steering mechanism on a preferred basis. If the driver turns the manual steering wheel more slowly, then a lesser oil flow to the first adjustment device 10 is obtained. As a result, the residual flow R going to the second adjustment device 15 again grows correspondingly. As a rule, the steering valve activation takes place in conjunction with reduced working flows so that the second adjustment device 15 must get along with a reduced oil supply only in extreme operating states of the steering mechanism. Further references concerning the operation of the generally known flow divider valve can be gleaned from the aforementioned German application No. 35 40 236.

Figure 2:
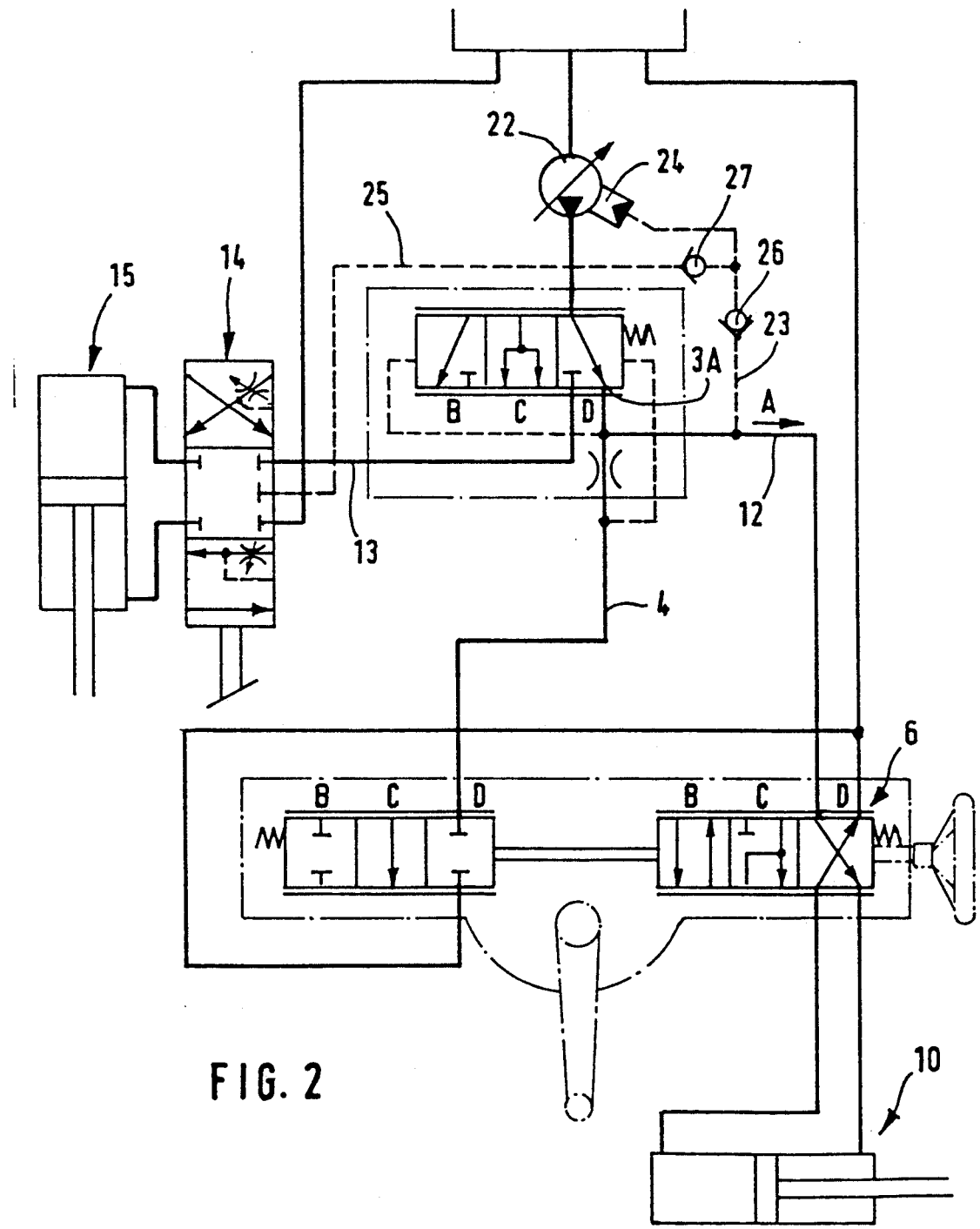
FIG. 2 is a circuit diagram of an alternate embodiment of the invention of FIG. 1 wherein a variable pump is utilized during steering movement.

The alternate embodiment of FIG. 2 differs from FIG. 1 by virtue of the fact that a variable pump 22 is provided in place of the constant pump 1. A lifting element 24 of the variable pump 22 is connected via a control line 23 to the flow line 12 which conducts the working flow A for the steering mechanism. The differential pressure, generated in the neutral position C of steering valve 6 in front of control edge 3A as a result of the buildup of the oil pressure is about 12-15 bar and serves to regulate the pump 22. This differential pressure, when the second adjustment device 15 is not activated, acts upon pump 22 in the direction toward a stroke reduction. Pump 22 is so adjusted that it maintans flow component T. Control edge 3A in the process releases a comparatively small opening cross-section.

In the extreme position D of steering valve 6 in the event of a very fast steering movement, control edge 3A opens wide owing to a shift of valve piston 20 of the flow divider valve 3 to the left so that the pressure difference will be almost zero. Stroke element 24 of pump 22 then swings into the maximum delivery position.

Stroke element 24 of pump 22 is influenced via a control line 25 in the same manner by the second adjustment device 15. As indicated by small adjusting chokes, activation valve 14 generates the necessary differential pressure. The particular control position of activation valve 14 thus also helps influence the delivery volume of pump 22.

In both control lines 23 and 25, there are nonreturn valves 26 and 27 which open in the direction toward pump 22. In this way, one can make sure that the adjustment device with the higher pressure will always set pump 22 for the needed oil requirement.

I claim:

1. In a control mechanism for two hydraulic adjustment devices including a pump (1) for supplying pressurized hydraulic fluid, a divider valve (3) connected with said pump, said divider valve having first and second flow lines, a first hydraulic adjustment device (10) connected with said first flow line (12), said first adjustment device comprising a steering mechanism for a motor vehicle, steering valve means (6) connected with said first flow line between said divider valve and said first adjustment device for controlling, the delivery of hydraulic fluid to said first adjustment device, a second hydraulic adjustment device (15) connected with said second flow line (13), an activation valve (14) connected with said second flow line between said divider valve and said second adjustment device, and a pilot flow line (4) connected between said first flow lines and a non-return return line (11) aid pilot flow line containing a measurement diaphragm (9) for restricting the flow of pressurized fluid in said pilot flow line, the improvement which comprises (a) said steering mechanism comprising a hydraulic steering unit having a mechanical connection between a manual steering wheel and a manual force device connected to means for manual steering of the wheels of a motor vehicle;

a pilot valve (5) connected with said pilot line; and (c) a connecting member (7) for connecting said pilot valve with said steering valve means for shifting movement therewith in response to operation of the steering wheel, whereby when said steering valve means is in a neutral position, said pilot valve connects said first flow line with said non-return line, and when said steering valve means is shifted to a working position, said pilot valve is shifted to block said pilot line.

2. A steering mechanism as defined in claim 1, wherein said pump is a constant pump.

3. A steering mechanism as defined in claim 1, wherein said pump is an adjustable pump, said further comprising a first control line (23) containing a non-return valve (26) connected between said pump and said first flow line, and a second control line (25) containing a non-return valve (27) connected between said pump and said activation valve, said first and second control lines controlling an adjustment element of said pump.

* * * * *